United States Patent [19]
Johnston

[11] 4,056,164
[45] Nov. 1, 1977

[54] STABILIZED PORTABLE SEISMIC SIGNAL TRANSDUCER

[75] Inventor: Otis A. Johnston, League City, Tex.

[73] Assignee: Western Geophysical Co., Houston, Tex.

[21] Appl. No.: 707,178

[22] Filed: July 21, 1976

[51] Int. Cl.² .......................... G01V 1/04; G01V 1/14
[52] U.S. Cl. .................................. 181/114; 181/116; 181/119
[58] Field of Search ............... 181/113, 114, 116, 117, 181/119, 121

[56] References Cited

U.S. PATENT DOCUMENTS

| 3,658,148 | 4/1972 | Clynch | 181/114 |
|---|---|---|---|
| 3,690,402 | 9/1972 | Stafford | 181/114 |
| 3,777,843 | 12/1973 | Fair et al. | 181/114 |
| 3,884,324 | 5/1975 | Hamilton et al. | 181/114 |
| 3,976,161 | 8/1976 | Carman, Jr. et al. | 181/113 |

Primary Examiner—Howard A. Birmiel
Attorney, Agent, or Firm—William A. Knox

[57] ABSTRACT

A seismic signal source apparatus is mounted on the bed of a vehicle by means of a support structure. The apparatus includes a base plate coupled to ground surface beneath the vehicle as well as a seismic signal transducer to inject sweep signals into the ground through the base plate. A restraining means is connected between the upper end of the transducer support structure and the vehicle bed to prevent rocking motion of the seismic signal source. The restraining means includes a double-acting hydraulic piston. The piston is provided with at least two spring-loaded, oppositely-directed check valves. The spring loaded valves open to allow the transducer base plate to adjust itself to the local ground contours when the transducer base plate is pressed to the ground by the weight of the vehicle. The valves remain closed during a sweep cycle to provide a rigid restraining link which prevents destructive rocking movements of the transducer and base plate during a sweep cycle.

17 Claims, 4 Drawing Figures

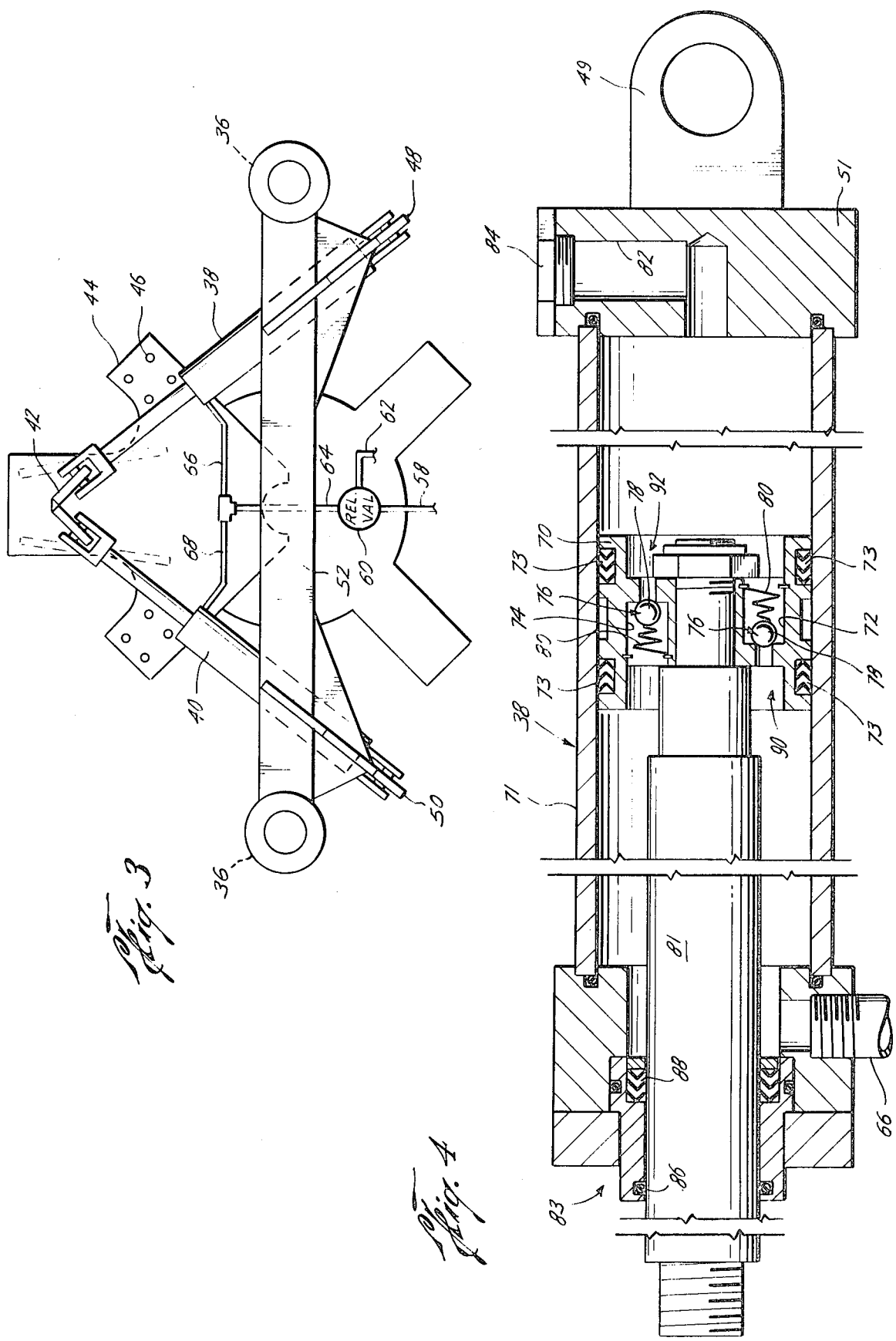

STABILIZED PORTABLE SEISMIC SIGNAL TRANSDUCER

BACKGROUND OF THE INVENTION

1. Field of the Invention

This invention relates to portable seismic signal source systems, and more particularly, to such systems of the vibrator or impulse type.

2. Description of the Prior Art

Transportable vibrator-type or impulse-type seismic signal sources are in wide use in seismic exploration. Examples of such devices are disclosed in U.S. Pat. Nos. 3,306,391; 3,550,719; 3,811,530; 3,905,446; and 3,295,630. In vibrator-type sources in particular, a vehicle such as a truck supports a large, heavy, substantially horizontal base plate that is connected by a vertical shaft to an inertia mass. A hydraulic linear actuator causes the base plate to move in reciprocating motion along a vertical axis against the reaction of the inertia mass. The base plate injects a swept-frequency vibratory signal train or "sweep" into the ground that lasts for several seconds (a "sweep cycle"). The frequency of the vibratory signal may be varied continuously throughout the sweep cycle, for example from 10 to 70 Hertz although frequencies from 5 to more than 80 Hertz may be employed. During the sweep cycle, a portion of the weight of the truck is applied to the base plate through isolating springs. The isolating springs are sufficiently compliant to permit the base plate, the vertical shaft connected thereto, the inertia mass and associated support structure to tilt a few degrees about the vertical axis with respect to the vehicle. A small amount of tilt with respect to the vehicle is necessary in order to allow the base plate to adjust itself to the local ground contour. So long as most of the area of the base plate remains firmly coupled to the ground the sweep signal will be reliably injected into the ground along a substantially vertical axis under the driving force of the linear actuator against the inertia At certain frequencies around 14 Hz, the entire system becomes resonant. As is well known in the science of kinetics, in an undamped vibratory system, at frequencies in the region of the resonant frequency, a very small disturbing force will cause, theoretically at least, an infinite increase in the displacement of the oscillating mass. Hence, at resonance, particularly in rough terrain, the base plate and supporting structure violently dance or rock from side to side, fore and aft and in combinations thereof, about the vertical axis of the supporting structure. The violent rocking motion not only causes the base plate to become decoupled from the ground, thereby degrading the injected signal, but also causes severe structural damage to the entire vibrator assembly. There is a need therefore, for a restraining device to prevent the violent rocking motion of a vibrator apparatus.

SUMMARY OF THE INVENTION

Applicant solves the above rocking problems by providing a restraining means which resists rocking transversely to the vertical axis of the seismic energy source. The restraining means, which may be a hydraulic damper or snubber, permits the base plate to adjust itself to rest flat on the local ground contours but holds the vertical axis of the base plate supporting structure substantially in a fixed position laterally, during a sweep cycle to prevent initiation of undesired rocking motions.

The apparatus of the present invention includes a vehicle having a frame for mounting a seismic signal transducer. The transducer, including a base plate attached thereto, is coupled to the vehicle frame by means of a support structure having a vertical axis. A hydraulic lift means urges the transducer into contact with the ground during a sweep cycle or lifts the transducer from the ground when the vehicle is to be moved. A hydraulic restraining device is connected between the top of the transducer support structure and the vehicle frame to prevent rocking motion of the transducer and its support structure about the vertical axis. The restraining device includes a hydraulic piston and cylinder assembly. High pressure relief valving is provided to permit movement of the hydraulic piston thereby to allow adjustment of the transducer base plate to the ground.

In accordance with an aspect of this invention, the hydraulic damper defines a low-pass mechanical filter to prevent generation of lateral disturbing forces, having frequencies exceeding 0.05 Hz, in the supporting structure and base plate of a seismic signal transducer, during a vibrator sweep cycle.

In accordance with another aspect of this invention, the hydraulic damper acts as a dashpot or compliant support between the seismic transducer supporting structure and the vehicle mounting frame for disturbing forces having a frequency in the range of one cycle per minute or less, but becomes a rigid restraint for disturbing forces having a frequency in the range above 5 Hz.

BRIEF DESCRIPTION OF THE DRAWINGS

These and other objects and advantages of the present invention are hereinafter set forth and explained with reference to the drawings wherein:

FIG. 3 is a plan view of the apparatus shown in FIG. 2 taken along line 3—3 and showing schematically the hydraulic system.

FIG. 4 is a partial sectional view of the damper piston and cylinder illustrating the valve-controlled passages through the piston.

DESCRIPTION OF THE PREFERRED EMBODIMENTS

The present invention will be described with particular reference to a vibrator-type seismic signal source, although it is not limited thereto.

Figure 1:
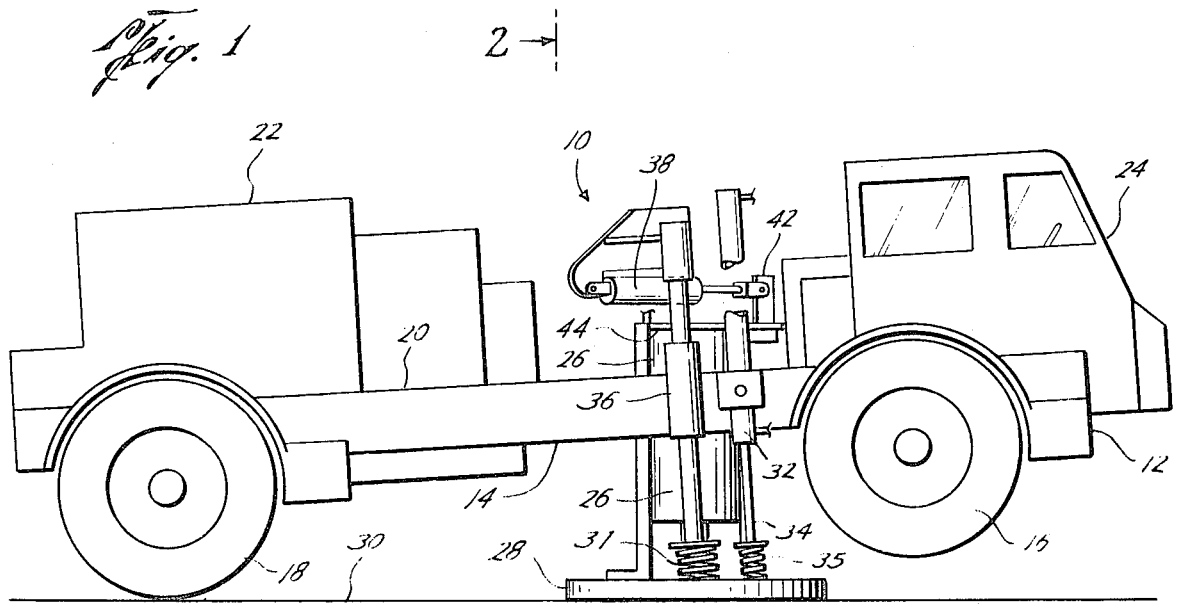
FIG. 1 is a side elevation view of the improved portable seismic energy apparatus of the present invention.
Figure 2:
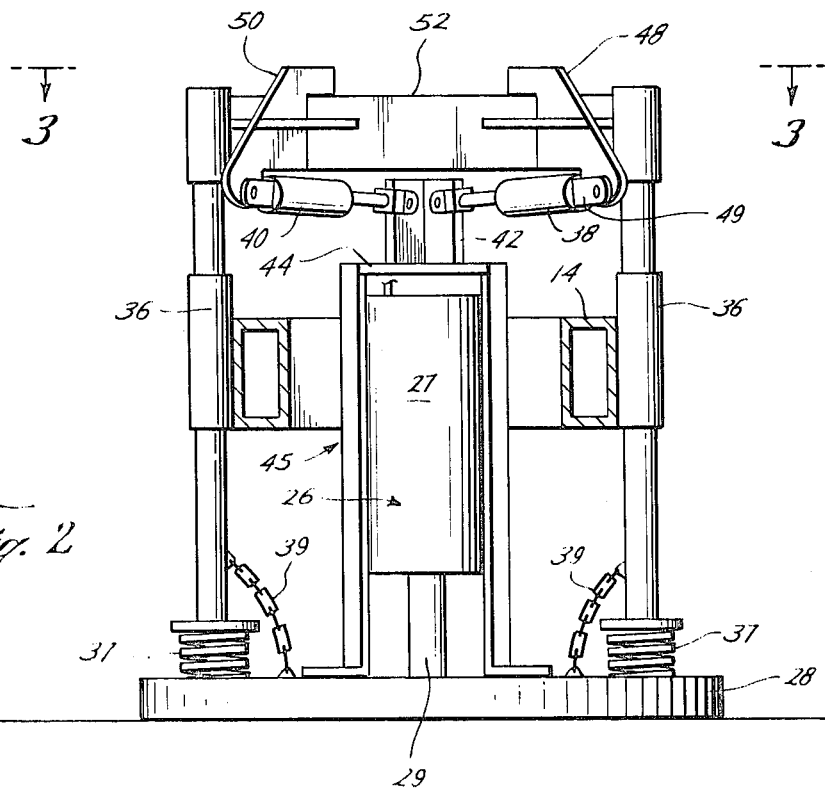
FIG. 2 is a partial sectional view of the apparatus of FIG. 1 taken along line 2—2.

As shown in FIGS. 1, 2 and 3 wherein like parts are identified by similar numbers, the preferred apparatus of the present invention is a portable seismic signal source apparatus 10. The apparatus 10 includes a vehicle or truck 12 which has a frame 14 extending between the front wheels 16 and rear wheels 18 and supporting the bed. On the bed are mounted certain equipment including a prime mover 22, such as a diesel engine, which is connected to hydraulic pump 20. The vehicle 12 also includes a cab 24 from which the vehicle 12 is operated.

A seismic-signal source 26 is coupled to the base plate 28 and is adapted to impart a vibratory sweep signal to the base plate 28 when the base plate 28 is firmly held against the ground 30 as shown in FIG. 1. Vibratory signal source or transducer 26 includes an inertia mass 27 and a hydraulic linear actuator (not shown). A vertical shaft 29 couples the base plate 28 to the linear actuator. In operation, the linear actuator drives base plate 28 through shaft 29 against the reaction of inertia mass 27 thereby to inject a sweep signal into the ground. Refer particularly to U.S. Pat. No. 3,306,391 for an example of such a mechanism. A substantial portion of the weight of vehicle 12 is applied to the base plate 28 as shown in FIG. 1 by actuation of the hydraulic lift actuator 32. The actuator 32 is supported from the frame 14 by rod 34 connected through isolating spring 35 to the base plate 28. The movement of the base plate is controlled by the guide cylinders 36 which are supported from the frame 14 and are suitably connected to the base plate 28 compliant isolating springs 37, for isolating vibrations of the base plate from the vehicle 12. The isolator springs 35 and 37 are sufficiently compliant to allow a relative tilt of the base plate 28 and energy source 26 with respect to the vehicle frame 14 and lift actuators 32. The total amount of tilt is limited by restraining chains 39.

The apparatus described thus far is capable of imparting a suitable vibratory seismic signal to the ground under ideal circumstances. In rough terrain however, a severe rocking motion of the transducer and its support structure may occur to such apparatus at a resonant frequency of about 11–15 Hertz. The rocking motion causes decoupling of the base plate from the ground and causes severe structural damage to the equipment. In order to avoid this problem, the present invention provides a restraining means for preventing such rocking motion.

The means for restraining the seismic source, also referred to herein as a hydraulic damper or snubber, is shown in FIGS. 1, 2 and 3 and includes the hydraulic dampers 38 and 40. The rod ends or rams of dampers 38 and 40 are connected to bracket 42 which is suitably secured by welding or other means to a plate 44, mounted on transducer supporting structure 45. Plate 44 is secured to the top of the supporting structure 45 by bolts 46. The other, or cylinder ends of dampers 38 and 40 are secured to the brackets 48 and 50 by clevises 49, welded to end cap 51. Brackets 48 and 50 are supported from cross beam 52 extending between the two guide cylinders 36. It should be noted that the dampers 38 and 40 are generally parallel to the ground when the system is on level ground as shown in FIG. 1. However, as discussed above, the system is designed to allow the base plate 28 to rest flat against the local ground contour even when the ground surface dips at a small angle such as 6°–7° with respect to the frame 14 of the vehicle. The two connections of the dampers 38 and 40 are pivotally mounted by suitable pins along a horizontal axis to insure that the dampers and their mountings do not interfere with the vertical-acting forces generated by seismic energy source 26.

The hydraulic system for the dampers 38 and 40 is shown schematically in FIG. 3. A supply of hydraulic fluid under pressure is delivered from pump 20 through line 58 and through the pressure relief valve 60. The pressure relief valve 60 is provided with a vent line 62 where excess pressure may be vented back to the system reservoir (not shown). From pressure relief valve 60 hydraulic fluid flows through line 64 to branch inlet lines 66 and 68, into cylinders 71 of dampers 38 and 40 under a substantially constant pressure. By continuously supplying hydraulic fluid under pressure, the cylinders are kept filled (FIG. 4) despite movement of the piston rod within the cylinder which changes the volume in the left-hand side of the cylinder.

The piston and piston rods of dampers 38 and 40 must be movable when base plate 28 is pressed against the ground in order to allow the base plate to adjust itself to the local ground contours. That is, transducer support structure 45 must be free to tilt a small amount as discussed above. But in operation, during a sweep cycle, support structure 45 must be held rigidly in place by dampers 38 and 40. This function is implemented by providing spring-loaded check valves in the pistons of dampers 38 and 40 as will now be discussed with reference to FIG. 4.

Each piston 70 is suitably sealed by piston-ring sealing means 73 and is enclosed within its cylinder 71 closed at one end, for sliding movement. The piston 70 is provided with at least two passageways or orifices 72 and 74 extending through the piston 70 to provide communication between opposite sides of the piston 70. The passageways 72 and 74 each have a ball check valve 76 in which balls 78 are preloaded by springs 80 so that the valves remain closed until a pressure differential of 70 to 90 psi is exerted thereacross, at which point they open. There are preferably four passageways and two pairs of oppositely-directed check valves in the piston 70, one valve-pair allowing fluid flow in each direction. Each of the spring-loaded ball check valves 78 open when exposed to a fluid pressure differential in one direction, but seal off reverse fluid flow.

While in some respects the hydraulic damper above resembles the common shock absorber, its operation is fundamentally different. In common shock absorbers the movement of the piston generates a small counteracting force proportional to the velocity of movement but does not completely inhibit movement. In fact, for an initial fraction of an inch, a shock absorber exerts no counteracting force. If the base plate mass of this invention were permitted to even begin to rock during a sweep cycle, the forces generated would rapidly build up and, at resonance, become too large to be overcome by any conventional shock absorber. Through the use of the spring-biased valves in the hydraulic dampers 38 and 40, the dampers exert a small holding force in both directions that is sufficient to prevent any start of oscillations or rocking motions having a frequency in the vicinity of the resonant frequency. Thus, the invention herein prevents any rocking motion from ever starting.

Piston rod 81 is connected to piston 70 and is guided through end cap 83 of damper 38 for axial movement in housing 71. End cap 83 includes suitable hydraulic seals 86 and 88.

Damper 38 includes a bleed hole 82, normally closed by a plug 84. Air is expelled from the cylinder 71 initially through bleed hole 82 until the damper is completely filled with pressurized hydraulic fluid fed through inlet line 66, after which bleed hole 82 is sealed. Applying a pressure of about 350 psi to the left side of piston 70 in FIG. 4, the lower valve 72 will open to allow flow of the pressurized fluid through passageway 72 until the pressure on the right side of piston 70 reaches 270 psi, assuming that check valve 76 is preset to open at a pressure differential of 80 psi.

By way of example, the stroke of piston 70 is about 14 inches. Piston 70 is preferably positioned approximately in the middle of its cylinder or housing 71 so that it is free to move axially within the cylinder 71 in either direction, about 7 inches. With the dampers 38 and 40 charged with pressurized fluid as described, any lateral movement of the seismic energy source 26 in either direction is resisted by a force equal to the pressure differential across the pistons 70 multiplied by the effective exposed area on each face of the pistons 70. When the above force is exceeded, the pistons move but continually exert this force to resist any rocking motion of the source 26.

By way of example but not by way of restriction, consider the diameter of piston 70 to be 2.50 inches. On the left side of piston 70, the smaller diameter of rod 81 that bears against face 90 of piston 70 is 1.375 inches. Accordingly, the effective area on the left face 90 of piston 70 is 3.43 square inches and on the right face 92 the area is 4.91 square inches. With an applied pressure of 350 psi at inlet port 66 and a pressure differential of 80 psi across the piston, the force on piston face 92 is about 125 pounds greater than the force on piston face 90. When base plate 28 is retracted from the ground the bias force of about 125 pounds causes support structure 45 to tend to tilt away from vehicle cab 24 against the resistance of compliant isolating springs 37. Compared to the tension of springs 32, which may be a ton or more, the approximate 125-psi bias force is insignificant.

It would, of course, be possible to equalize the pressure on opposite sides of piston 70 by use of valving and plumbing external to cylinder 71 by means well known to the hydraulic art. In this case, any axial movement of the piston 70 along cylinder 71, would be opposed only by the 80-psi spring loading of check valves 76.

When pressed against the ground by actuators 32, the applied weight of vehicle (which may be several tons) is more than enough to overcome the small bias force of 125 pounds. As base plate 28 slowly settles into position, ram 81 attached to support structure 45 moves piston 70 along cylinder 71, with excess fluid pressure on the compression side of the piston being relieved through the appropriate check valves 76. In operation, when a vibratory signal is being injected into the ground, the bias force due to the pressure differential created by the spring-loaded check valves holds support structure 45 firmly in the position originally assumed by the base plate. Thus the pistons will move in response to a relatively slow powerful displacement of the top of support structure 45, as when base plate 28 settles in place. But relatively-rapid, angular jerk motions applied laterally to the vertical axis of support structure 45 resonance are effectively suppressed.

Field observations of the equipment operation reveal that about two seconds are required to press the transducer base plate 28 to ground 30 after the vehicle has moved into position. Assuming for the moment that the ground slopes 6° relative to the vehicle, the vertical axis of support structure must rotate laterally 6° within 2 seconds. This rotation rate or "settling frequency" is equivalent to one-half cycle per minute or about 0.01 Hz. At this very low frequency, the hydraulic dampers 38 and 40 function mainly as dashpots. The dampers are, in effect, compliant supports.

The lowest, generally-used seismic sweep frequency is on the order of 10 Hz, a frequency that is one thousand times greater than the settling frequency. At such normal, relatively high seismic frequencies, dampers 38 and 40 behave as rigid restraints to prevent the start of lateral oscillations during a sweep cycle.

The dampers thus define a low-pass, mechanical filter that is responsive to very low frequencies on the order of 0.05 Hz, but one that is completely unresponsive to high frequencies in the band of conventional seismic frequencies. The filter response is controlled by the check-valve spring tension and hence the bias force, as well as the size of the orifices 72, 74 in the body of piston 70.

The pressure of hydraulic fluid applied to line 64 is not critical as long as it is greater than the pressure value determined by the springs 80 of check valves 76. However, it is believed that the pressure developed by the hydraulic pumps at idle speed, known as the "charge" pressure, is a sufficient minimum pressure to operate the invention.

The two dampers 38 and 40, as shown in FIG. 3, are in angular relation to each other, preferably a 90° angle, whereby the two will not only restrain fore-and-aft but also side-to-side rocking motions and combinations of both. If only a fore-and-aft rocking motion is of concern, then of course a single damper could be mounted to restrain this type rocking motion.

From the foregoing it can be seen that the present invention restrains any rocking motion of the seismic energy source thereby insuring that the seismic signals provided thereby are delivered while minimizing any decoupling of the base plate from the ground and preventing structural damage to the system.

The dampers of this invention have been described in terms of preferred hydraulic devices. Other embodiments fall within the scope of this invention. As is well known to the art, electro-mechanical, mechanical and pneumatic analogs of the hydraulic system can be readily substituted in the design of the dampers.

What is claimed is:

1. A portable seismic signal source apparatus comprising:

a seismic energy source, a base plate, said source being connected to said base plate;

a vehicle having a frame;

a hydraulic actuating means mounted on said frame and connected to said base plate, for raising said base plate above the ground surface during movement of the vehicle and for applying a substantial portion of the weight of said vehicle to said base plate while it is in contact with the ground surface;

a pair of hydraulic dampers;

a bracket secured to the top of said seismic energy source;

means for connecting one end of each of said dampers to said bracket;

means for connecting the opposite ends of said dampers at spaced apart positions on a structure supported from said vehicle frame;

means for pivotally mounting both ends of said dampers about a substantially horizontal axis whereby said dampers do not restrict the vertical movement of said seismic energy source;

a source of hydraulic fluid under pressure;

means for delivering said hydraulic fluid under a preselected clarge pressure to said dampers; and each of said dampers having a piston and at least two valve-controlled passages interconnecting opposite sides of said pistons, the valves in said passages being resiliently loaded to allow flow through the valves when the pressure differential across the piston reaches a preselected minimum, one of said valves in each of said dampers being positioned to relieve pressure in one direction across the piston and another of said valves being positioned to relieve pressure across its piston in the opposite direction.

2. A seismic signal source apparatus comprising:
a transducer means for imparting seismic energy to the ground;
means for supporting said seismic transducer means;
means connected between said transducer means and said supporting means for restraining said transducer means from rocking movement said restraining means including a hydraulic damper connected between said transducer means and said supporting means, said damper including:
a piston slidably positioned within said damper and adapted to move axially therein;
said piston having first and second hydraulic passageways therein;
a first check valve positioned in said first passageway;
a second check valve positioned in said second passageway;
each of said first and second check valves being biased to permit flow of hydraulic fluid in one direction when the pressure differential of said hydraulic fluid on said valve exceeds a predetermined amount while preventing all flow of hydraulic fluid in the opposite direction,
said first and second check valves being oppositely directed so that one valve allows the flow of fluid from one side of the piston to the other, while the other valve allows flow in the opposite direction.

3. The apparatus of claim 2 including means for supplying hydraulic fluid under substantially constant pressure to one end of said damper.

4. The apparatus of claim 3 including a second hydraulic damper connected between said transducer means and said mounting means, said first and second hydraulic dampers positioned in angular relationship to each other.

5. A portable seismic signal source apparatus, comprising:
a seismic energy source;
a base plate;
said source being coupled to said base plate and adapted to impart seismic energy to the ground through said base plate;
a vehicle having a frame;
means supported on said frame for raising and lowering said base plate and for exerting a substantial portion of the weight of said vehicle on said base plate while said base plate is imparting seismic energy from said source to the ground;
at least one hydraulic damper connected between said frame and said source; and
means for releasably biasing said damper to resist a lateral rotational motion of the vertical axis of said source without restricting the axial movement therealong.

6. A portable seismic source according to claim 5, including
two hydraulic dampers connected to said source and extending toward their respective frame connections so that their axes are positioned at an angle to each other.

7. A portable seismic source according to claim 6 wherein
said damper includes a piston within a cylinder,
means for delivering hydraulic fluid at substantially constant pressure to one end of said damper, and
means for establishing a desired pressure differential across said piston.

8. A seismic source apparatus comprising:
transducer means for imparting seismic energy into the ground;
means for mounting said transducer means;
damper means interconnecting said transducer means and said mounting means for restraining said transducer from rocking movements and defining a rigid brace for rotational disturbing forces having frequencies in the seismic band, said damper means including:
a cylinder;
a ram having a piston slidably engaging the interior of said cylinder, said piston having at least two orifices extending therethrough to provide fluid communication with both sides of said piston;
means for supplying hydraulic fluid at a predetermined pressure into one end of said cylinder;
at least two oppositely-directed check valves means for sealing each said orifice to allow flow of hydraulic fluid in only one direction through one of said orifices and in only the opposite direction through the other of said orifices; and
means for resiliently loading each said check valve to establish a preselected pressure differential on opposite sides of said piston, thereby to apply a bias force to said ram.

9. A seismic signal source apparatus comprising transducer means for imparting seismic energy into the ground;
means for mounting said transducer means;
damper means, interconnecting said transducer means and said mounting means, for restraining said transducer means from rocking movements and defining a rigid brace for rotational disturbing forces having frequencies in the seismic band, said damper means including:
a cylinder having a piston slidably engaging the interior of said cylinder, said piston having a first and a second hydraulic passageway extending through said piston in fluid communication with either side of said piston;
first check valve means in said first passageway which permits flow of hydraulic fluid from one side of the piston to the other side of said piston when the pressure differential across said fluid valve exceeds a preselected minimum; and
second check valve means in said second passageway which permits flow of hydraulic fluid in the opposite direction to that of said first check valve means when the pressure differential across said second valve exceeds a preselected minimum, whereby said damper exerts a restraining force on said transducer means and allows said transducer to move when the axial force on said damper exceeds the pressure required to activate one of said check valve means.

10. A portable seismic signal source including:
a seismic signal transducer for imparting seismic sweep signals into the ground having a seismic sweep-signal output frequency band of between about 5 and 100 Hz;
vehicle means for mounting and transporting said transducer;
supporting structure means having a vertical axis for supporting said transducer;
means for compliantly coupling said transducer and supporting structure to said vehicle;
restraining means for interconnecting the top of the vertical axis of said supporting structure means with said vehicle means, said restraining means including means for maintaining rigidity of said vertical axis against lateral rotational vibrations in said seismic output frequency band.

11. In a portable seismic signal generator including a vehicle having a frame, a seismic signal transducer for imparting signals into the ground, a supporting structure means, having a vertical axis, for supporting said transducer, and compliant means for coupling said supporting structure to said vehicle frame, the improvement comprising:
   a hydraulic snubber means for interconnecting said supporting means with said frame whereby said snubber means restrains rocking motion of said supporting structure but allows reciprocating motion parallel to the vertical axis of said supporting structure, said hydraulic snubber including a piston and piston rod slidably mounted within a cylinder that is closed at one end;
   means for providing hydraulic fluid at constant pressure into one end of said cylinder; and
   means for establishing a desired pressure differential across said piston thereby providing a bias pressure to exert a holding force substantially at a right angle to the vertical axis of said support structure;
   means for relieving excess differential pressure on the compression side of said piston when said piston is forcibly moved by a force exceeding said desired pressure differential.

12. The apparatus of claim 1 wherein said damper means defines a low pass mechanical filter for lateral rotational motions of said transducer.

13. The apparatus of claim 12 wherein the upper cut-off frequency of said low pass filter is 0.05 Hz.

14. The apparatus of claim 11 wherein said snubber means defines a low pass filter for lateral rotational rocking motions of the vertical axis of said supporting structure.

15. The seismic signal source as defined in claim 10 wherein:
   said restraining means defines a compliant support for said vertical axis at lateral rotational vibration frequencies substantially lower than the lowest frequency in said seismic sweep-signal output frequency band.

16. The seismic signal source as defined in claim 10 wherein:
   said restraining means defines a low pass mechanical filter for lateral rotational rocking motions of the vertical axis of said supporting structure, said restraining means being responsive to rocking motions having frequencies substantially below the lowest frequency in said output frequency band and being unresponsive to lateral rotational rocking motions having frequencies within and above said output frequency band.

17. The seismic signal source as defined by claim 10 wherein said restraining means permits translational movement of said transducer along the vertical axis of its supporting structure while restraining rotational rocking motions of the vertical axis of said transducer when said transducer is imparting seismic sweep signals into the ground.

* * * * *